Jan. 1, 1946.   J. P. CASSIA, JR   2,391,878
TOOL HOLDER
Filed Oct. 6, 1944   2 Sheets-Sheet 1

Inventor

JOSEPH P. CASSIA, JR.,

By *Clarence A. O'Brien and Harvey B. Jacobson*
Attorneys

Jan. 1, 1946. J. P. CASSIA, JR 2,391,878
TOOL HOLDER
Filed Oct. 6, 1944 2 Sheets-Sheet 2

Inventor
JOSEPH P. CASSIA, JR.,

By Clarence A. O'Brien
and Harvey B. Jackson
Attorneys

Patented Jan. 1, 1946

2,391,878

UNITED STATES PATENT OFFICE 2,391,878

TOOLHOLDER

Joseph P. Cassia, Jr., East Boston, Mass.

Application October 6, 1944, Serial No. 557,469

1 Claim. (Cl. 82—36)

The present invention relates to new and useful improvements in tool holders of a type wherein a cutting tool is carried on the cross feed of a hand screw machine and the invention has for its primary object to provide means for adjusting the block in which the tool is carried in order to obtain a more accurate cut on the work.

A further important object of the present invention is to provide an adjusting screw for the tool block and by means of which an exact adjustment of the tool may be obtained together with a micrometer gauge carried by the adjusting screw to indicate accurately the extent of adjustment thereof.

A still further object is to provide a tool holder of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
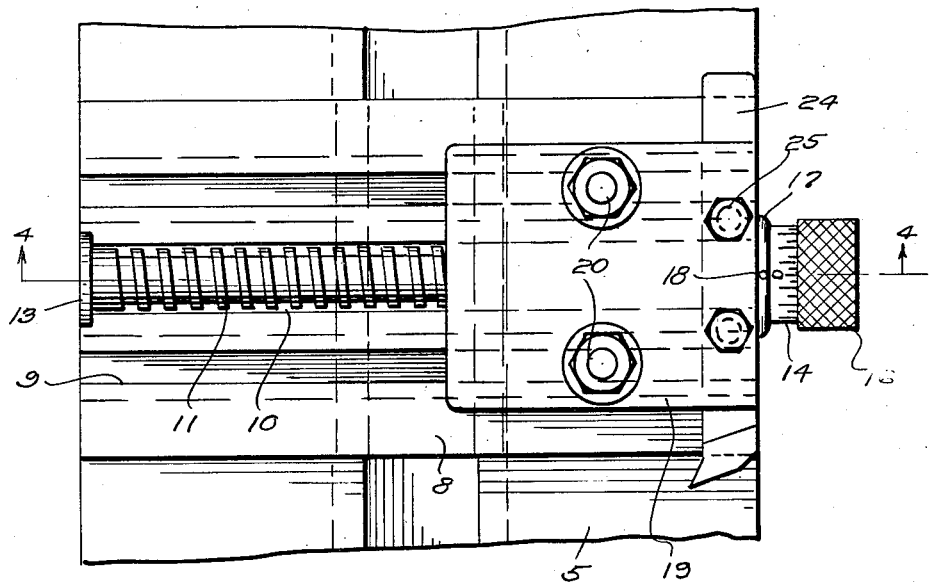
Figure 1 is a top plan view.
Figure 2:
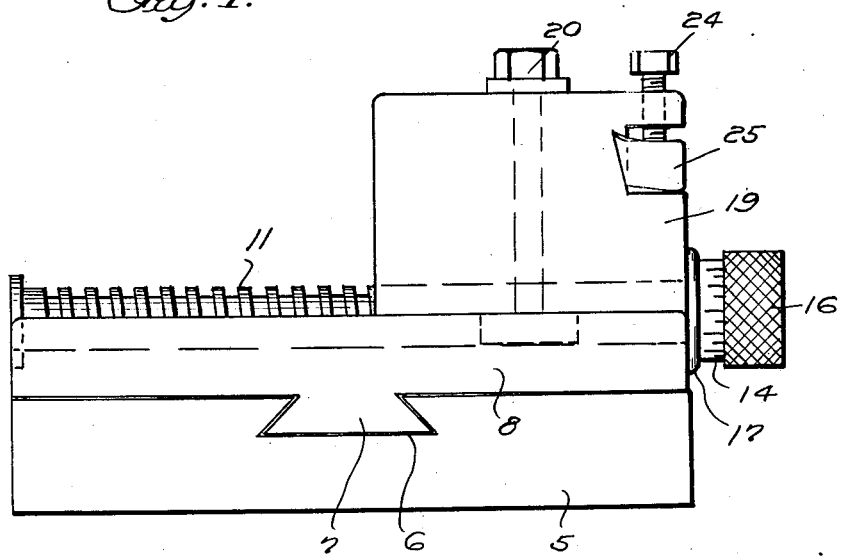
Figure 2 is a side elevational view.
Figure 3:
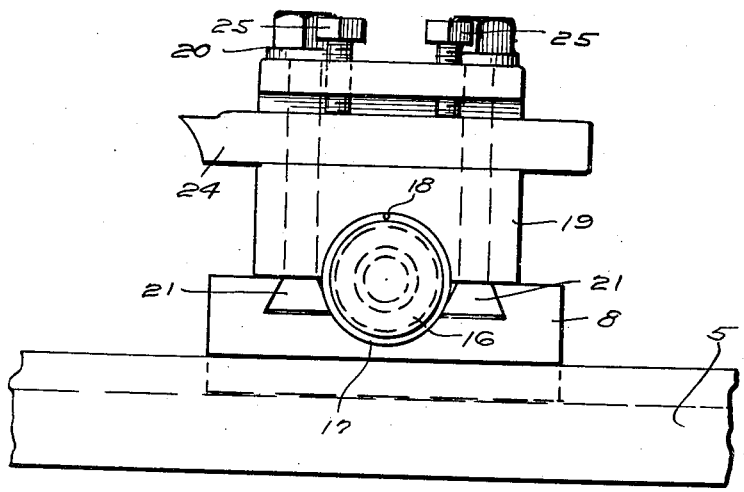
Figure 3 is an end elevational view.
Figure 4:
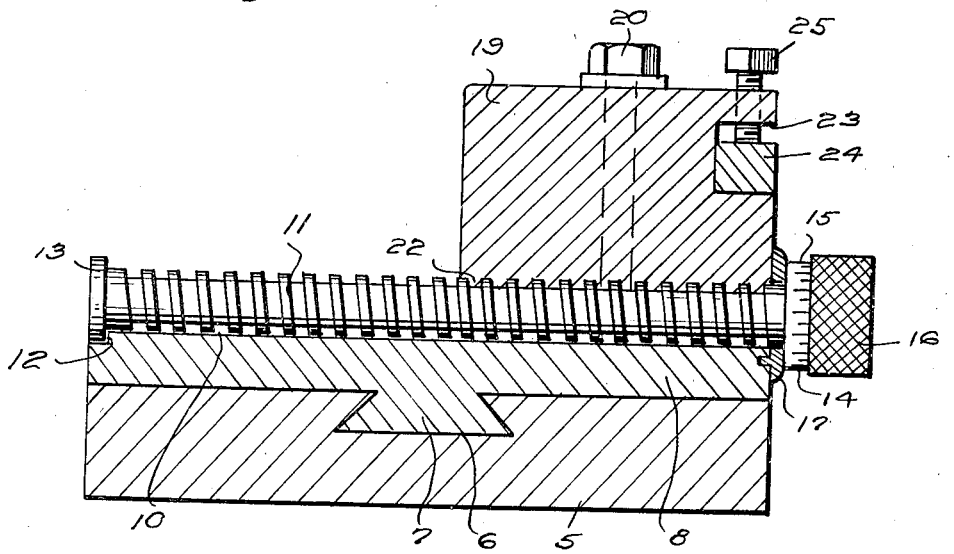
Figure 4 is a vertical sectional view taken substantially on a line 4—4 of Figure 1.

Referring now to the drawings in detail, wherein for the purpose of illustration I have disclosed a preferred embodiment of the invention, the numeral 5 designates the stationary table of a conventional form of hand screw machine and having a dove-tail groove 6 in its upper surface adapted for slidably receiving a complementary-shaped rib 7 on the underside of a lower tool holding block 8.

The block 8 is formed in its upper surface with a pair of spaced parallel dovetailed grooves 9 extending in a direction at right angles to the groove 6 of the table and also formed in the upper surface of the block 8 between the grooves 9 is a transversely curved groove 10 adapted for freely receiving a screw 11. One end of the groove 10 is formed with a shoulder 12 forming an abutment for a flange 13 on one end of the screw 11 to prevent longitudinal movement of the screw 11 in one direction while the other end of the screw 11 is formed with a collar 14 having a micrometer scale 15 marked thereon and outwardly of the collar is a knurled head 16 for manipulating with the groove. Suitably secured to the block 8 inwardly of the collar 14 is a ring 17 in which the screw 11 is freely rotatable, the ring having a fixed mark 18 thereon forming a setting for the micrometer scale.

An upper tool holding block 19 is provided with a pair of vertically extending bolts 20 having flared heads 21 on their lower ends conformably received in the grooves 9 for sliding engagement therein and the underside of the block 19 is formed with a threaded groove 22 for engagement by the threads of the screw 11 whereby to adjust the block 19 on the block 8 by the manipulation of the screw 11. One edge of the block 19 is formed with a horizontal groove 23 adapted for receiving a bit or cutter 24 of conventional construction secured in position by the set screws 25, the bit extending transversely of the screw 11 so that the manipulation of the screw will effect an adjustment of the cutter longitudinally of the screw.

From the foregoing it will be apparent that an accurate adjustment of the bit 24 relative to the work may be obtained through the manipulation of the screw 11.

It is believed that the details of construction and manner of use of the device will be readily understood from the foregoing without further detailed explanation.

Having thus described the invention, what I claim is:

A tool holder of the class described comprising a stationary table having a groove in its upper surface, a lower tool holding block having a rib on its undersurface slidably mounted in said groove, said block having a groove in its upper surface extending in a direction at right angles to the groove of the table, a shoulder at one end of said last-named groove, a screw freely mounted in said last-named groove, a flange on one end of the screw engageable with the shoulder to retain the screw against longitudinal movement in one direction, a micrometer collar on the other end of the screw, a ring secured to the lower block positioned inwardly of the collar and having indicating means thereon cooperating with the micrometer markings of the collar, a manipulating head on the end of the screw adjacent the collar, an upper tool block slidably mounted on the lower tool block, said upper tool block having a threaded groove in its under surface adapted for threaded engagement with said groove, said upper tool block having a tool mounted thereon and means carried by the upper block for securing the same in adjusted position on said lower block.

JOSEPH P. CASSIA, JR.